US011117475B2

(12) United States Patent
Cserna et al.

(10) Patent No.: US 11,117,475 B2
(45) Date of Patent: Sep. 14, 2021

(54) SYSTEMS AND METHODS FOR EFFICIENT VEHICLE CONTROL

(71) Applicant: Woven Planet North America, Inc., Los Altos, CA (US)

(72) Inventors: Bence Cserna, Durham, NH (US); Carlos Alberto De Magalhaes Massera Filho, Santa Clara, CA (US); Di Sun, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 218 days.

(21) Appl. No.: 16/167,061

(22) Filed: Oct. 22, 2018

(65) Prior Publication Data
US 2020/0122588 A1 Apr. 23, 2020

(51) Int. Cl.
*B60L 15/20* (2006.01)

(52) U.S. Cl.
CPC ..... *B60L 15/2045* (2013.01); *B60L 2240/622* (2013.01); *B60L 2240/625* (2013.01); *B60L 2240/627* (2013.01); *B60L 2240/68* (2013.01)

(58) Field of Classification Search
CPC .......... B60L 15/2045; B60L 2240/622; B60L 2240/68; B60L 2240/627; B60L 2240/625; B60L 58/12; B60L 2260/52; B60L 2240/80; B60L 2240/642; B60L 50/16; B60L 7/10; Y02T 10/7072; Y02T 10/70; Y02T 10/64; Y02T 90/16; Y02T 10/72

USPC ........................................................... 701/25
See application file for complete search history.

(56) References Cited

U.S. PATENT DOCUMENTS

| | | | |
|---|---|---|---|
| 2009/0118970 A1 | 5/2009 | Daum et al. | |
| 2013/0116870 A1 | 5/2013 | Harty | |
| 2016/0304080 A1* | 10/2016 | Sugiyama | B60W 20/12 |
| 2016/0362096 A1 | 12/2016 | Nikovski et al. | |
| 2017/0036663 A1 | 2/2017 | Kim et al. | |
| 2017/0232952 A1* | 8/2017 | Blasinski | B60W 20/12 |
| | | | 701/22 |
| 2018/0162359 A1* | 6/2018 | Perkins | B60W 10/26 |

FOREIGN PATENT DOCUMENTS

CN 102509470 6/2012

OTHER PUBLICATIONS

Ewbank, How Regenerative Braking Works, Sep. 12, 2018, Engineering.com Online Resource <https://www.engineering.com/ElectronicsDesign/ElectronicsDesignArticles/ArticleID/17625/How-Regenerative-Braking-Works.aspx> (Year: 2018).*

* cited by examiner

*Primary Examiner* — Nadeem Odeh
(74) *Attorney, Agent, or Firm* — Christopher G. Darrow; Darrow Mustafa PC

(57) ABSTRACT

Systems, methods, and non-transitory computer-readable media can determine a trajectory for a vehicle, the trajectory associated with a predicted path to be traveled by the vehicle. A power optimization plan is generated for the vehicle based on the trajectory. One or more power management settings are modified based on the power optimization plan.

20 Claims, 10 Drawing Sheets

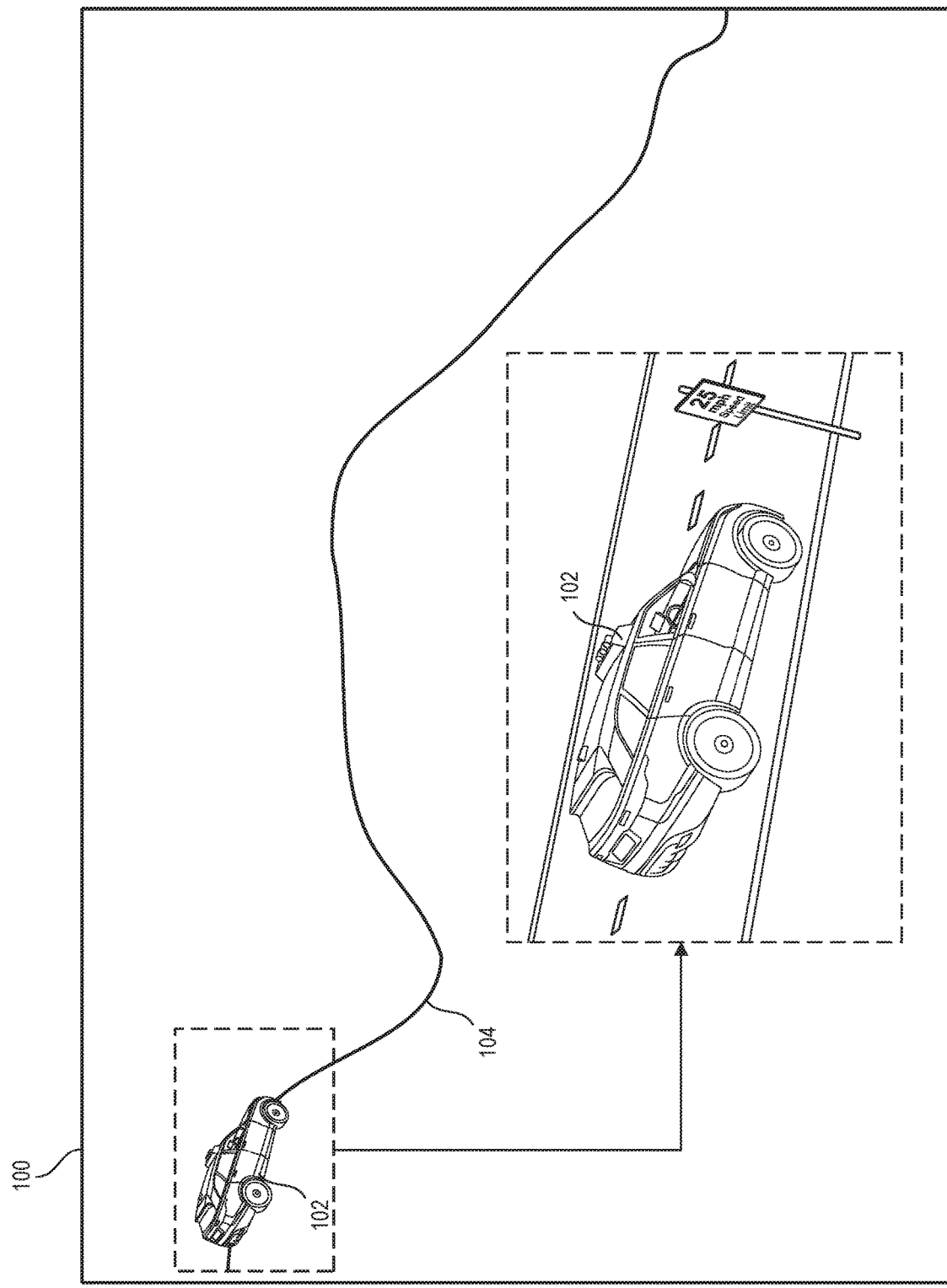

SYSTEMS AND METHODS FOR EFFICIENT VEHICLE CONTROL

FIELD OF THE INVENTION

The present technology relates to the field of vehicles. More particularly, the present technology relates to systems, apparatus, and methods for efficient control of autonomous, semi-autonomous, and manually-driven vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine a trajectory for a vehicle, the trajectory associated with a predicted path to be traveled by the vehicle. A power optimization plan is generated for the vehicle based on the trajectory. One or more power management settings are modified based on the power optimization plan.

In an embodiment, the modifying one or more power management settings comprises engaging or disengaging a gas engine on the vehicle.

In an embodiment, the modifying one or more power management settings comprises engaging or disengaging one or more electric motors on the vehicle.

In an embodiment, the modifying one or more power management settings comprises engaging or disengaging magnetic regenerative brakes on the vehicle.

In an embodiment, the trajectory comprises a plurality of positions defining the predicted path to be traveled by the vehicle. The trajectory also comprises, for each position of the plurality of position, a predicted velocity for the vehicle and a predicted acceleration for the vehicle.

In an embodiment, the power optimization plan comprises a first power management determination to be applied when the vehicle arrives at a particular position of the plurality of positions.

In an embodiment, a route to be taken by the vehicle is determined. The generating the power optimization plan for the vehicle comprises generating the power optimization plan for the vehicle based on the trajectory and the route In an embodiment, the route comprises a plurality of positions, and the power optimization plan comprises a power management determination to be applied at a particular position of the plurality of positions.

In an embodiment, semantic map information is identified for the route to be taken by the vehicle. The generating the power optimization plan for the vehicle comprises generating the power optimization plan for the vehicle based on the trajectory and the semantic map information.

In an embodiment, the trajectory for the vehicle is modified based on the power optimization plan.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 1A and 1B illustrate various challenges that may be experienced by a vehicle, according to an embodiment of the present technology.

Figure 1B:
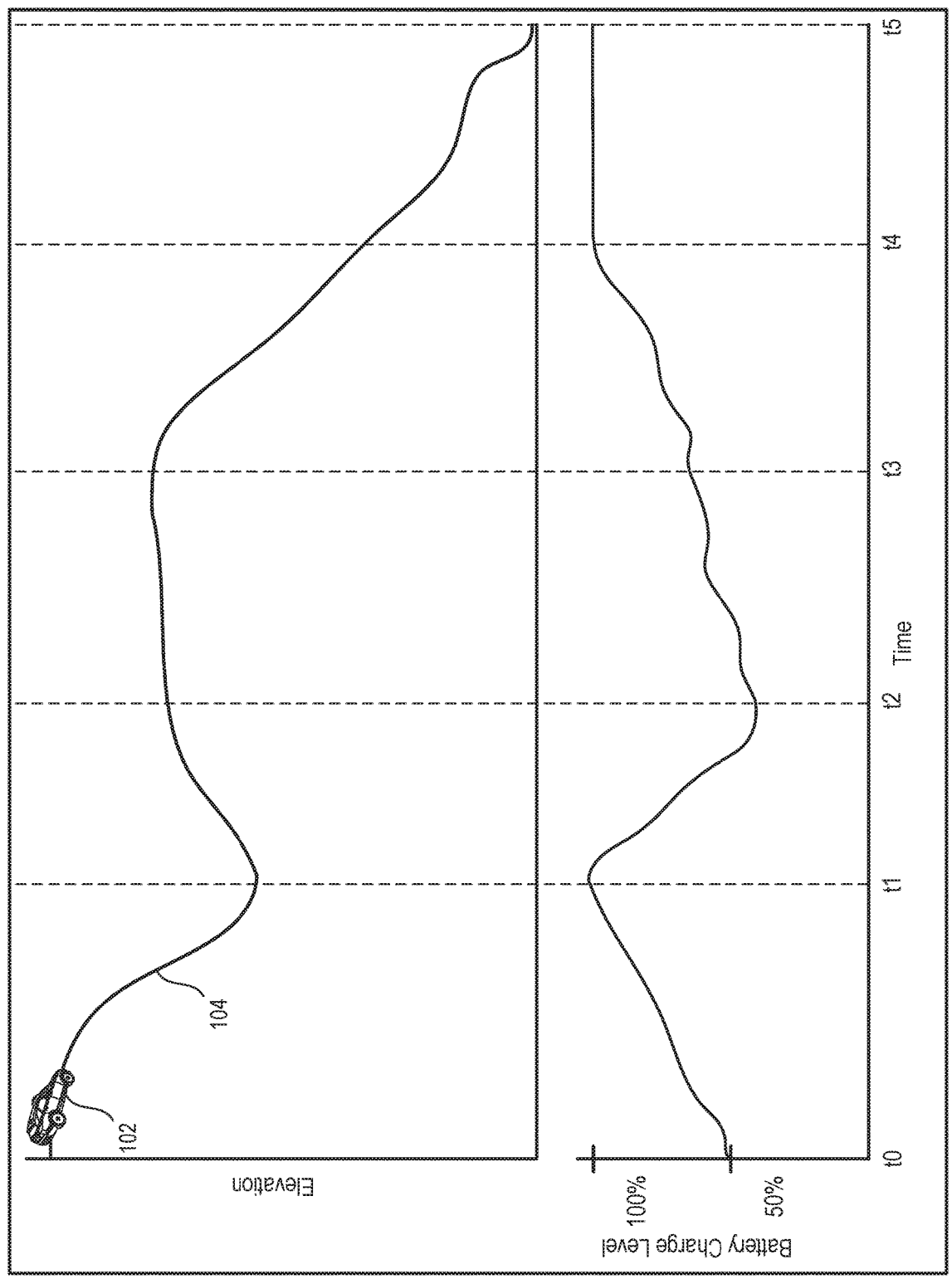

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Autonomous, semi-autonomous, or manually-driven vehicles may be used by a transportation management system to provide ride services or other types of services. A transportation management system may comprise a fleet of such vehicles. In certain instances, such vehicles may include electric vehicles that run on electric power, or hybrid vehicles that run on a combination of electric power and gas (or other fuel) power. Power management is an important consideration in maximizing efficiency of electric vehicles or hybrid vehicles. Conventional electric vehicles and hybrid vehicles attempt to optimize power usage by implementing various rules. For example, conventional hybrid vehicles may selectively utilize one or more electric motors or regenerative magnetic braking to try to maintain a battery charge level of approximately 50-60%. This ensures that the battery has sufficient charge to power the electric motor(s), while also maintaining capacity to be able to recover more energy (e.g., while the car is braking). However, the power management rules implemented in conventional hybrid vehicles are rudimentary and often ineffective. Relying on a limited set of knowledge about the vehicle's current status, conventional power management rules are limited to low probability assumptions about what a driver or vehicle will do next. As such, conventional approaches to vehicle power management often result in scenarios in which a vehicle's battery becomes undesirably full or undesirably empty, resulting in wasted energy either in the form of unnecessarily consumed fuel or lost opportunities to recoup energy. Such considerations are even more important in the context of a fleet of vehicles, as the costs incurred from wasted energy aggregate across an entire fleet of vehicles. Conventional approaches pose disadvantages in addressing these and other problems.

FIGS. 1A and 1B depict an example scenario 100 that is illustrative of various challenges that may be experienced using conventional approaches to vehicle power management. In FIG. 1A, a vehicle 102 is shown traveling on a path 104 with varying elevations. The vehicle 102 is a hybrid vehicle. As the vehicle 102 travels on the path 104, various power management features can be turned on or off to affect the charge stored on a battery installed in the vehicle 102. In FIG. 1B, the top portion of FIG. 1B shows the vehicle 102 traveling on the path 104. The path 104 is plotted on an axis to demonstrate that as time progresses, the vehicle 102 is traveling on the path 104 with changing elevation. The bottom portion of FIG. 1B shows an example plot depicting the charge level of the battery of the vehicle 102 as it traverses its route. From a time t0 to t1, the vehicle 102 is driving downhill. During this portion of the drive, the vehicle 102 has an opportunity to recharge the vehicle's battery, as the vehicle 102 will primarily be braking and may not be required to utilize its electric motor(s) at all. Accordingly, from time t0 to t1, the vehicle's charge level in this example increases from approximately 50% to maximum capacity. However, from time t1 to t3, the vehicle is primarily traveling uphill. Traversing uphill may require some expenditure of the charge that has accrued in the vehicle's battery, as the vehicle's electric motor(s) will have to do some work to push the car uphill. As such, from time t1 to t2, the vehicle's battery is discharged from approximately 100% to approximately 40%. At time t2, conventional vehicle power management schemes may make an effort to preserve the remaining 40% of charge on the vehicle battery by engaging or increasing a workload of a gas (or other fuel) engine on the vehicle 102 and disengaging electric motors on the vehicle 102. This allows the vehicle 102 to gain charge in the vehicle battery while the vehicle is operating on gas power. However, during this time, the vehicle 102 must expend gas. At time t3, the route of the vehicle 102 again begins to descend, resulting in gradual charging of the vehicle's battery from time t3 to t4. At time t4, the battery of the vehicle 102 is fully charged. However, the vehicle 102 continues to travel downward. As such, the battery of the vehicle 102 battery continues to remain fully charged at capacity from time t4 to t5.

In this example scenario, the gas expended during time t2 to t3 represents wasted energy. This is due to the fact that there was no need to maintain the vehicle's battery at 40% charge because, after the uphill portion of the route, an extended downhill portion would have allowed for the battery to be recharged. However, the vehicle 102, being unaware of this extended downhill portion, needlessly expended gas from time t2 to t3. Furthermore, the gas expended during time t2 to t3 resulted in the vehicle's battery being fully charged from time t4 to t5. This represents wasted energy in the form of lost opportunities to use regenerative braking due to the vehicle's battery being at full capacity. The example scenario 100 demonstrates how conventional approaches to vehicle power management can result in sub-optimal utilization of resources and wasted energy. While the example of a hybrid vehicle was presented in FIGS. 1A and 1B, it can be appreciated that similar challenges may exist in conventional electric vehicles.

An improved approach in accordance with the present technology overcomes the foregoing and other disadvantages associated with conventional approaches. The improved approach can allow vehicles to utilize trajectory information, map information, and/or route information to optimize vehicle control, including optimizing vehicle power management and optimizing transmission controls. In various embodiments, an autonomous, semi-autonomous, or manually-driven vehicle can use trajectory information to optimize vehicle power management. Trajectory information may specify an immediately upcoming intended or predicted path for a vehicle (e.g., an intended or predicted path for the subsequent 10-30 seconds). Trajectory information may also specify an intended or predicted velocity and/or acceleration for various points along the intended or predicted path. Using this information, the vehicle can make one or more power management determinations. The one or more power management determinations may, for example, modify one or more power management settings. For example power management determinations may include, but are not limited to, whether to engage or disengage a gas engine, and when to do so; whether to engage or disengage one or more electric motors, and when to do so; whether to engage or disengage regenerative magnetic braking, and when to do so and/or whether to shift gears from one gear to another, and when to do so. In certain embodiments, a vehicle can also utilize route information and a preconstructed semantic map to optimize vehicle power management. The preconstructed semantic map may provide various details about an intended route the vehicle will take, such as the locations of road constraints or obstacles, speed limits of roads, traffic conditions on roads, inclines/declines of roads, and the like. While trajectory information allows the vehicle to make power management determinations for a predetermined amount of time in the immediate future, route and semantic map information can allow the vehicle to make predictive power management determinations that account for the entirety of the route over a longer duration of time. In other embodiments, other vehicle settings or features can be modified based on trajectory, route, and/or semantic map information. In various embodiments, the specific factors taken into account in making particular power management determinations may vary based on whether a vehicle is manually driven, autonomously driven, or semi-autonomously driven. More details relating to the present technology are provided below.

Figure 2:
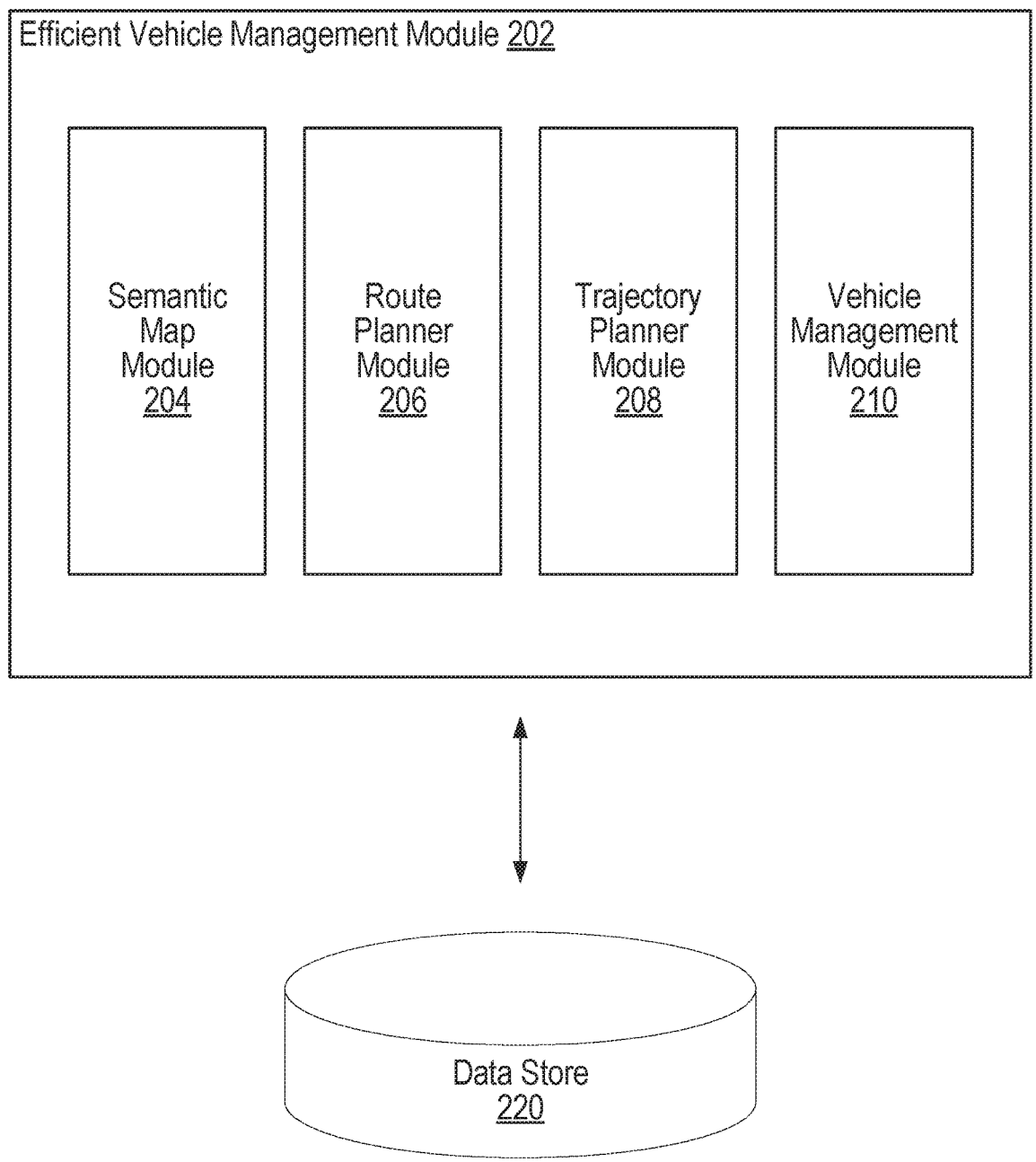
FIG. 2 illustrates an example efficient vehicle management module, according to an embodiment of the present technology.

FIG. 2 illustrates an example system 200 including an example efficient vehicle management module 202, according to an embodiment of the present technology. As shown in the example of FIG. 2, the efficient vehicle management module 202 can include a semantic map module 204, a route planner module 206, a trajectory planner module 208, and a vehicle management module 210. In some instances, the example system 200 can include at least one data store 220. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the efficient vehicle management module 202 and its sub-modules may be performed by one or more backend computing systems, such as a transportation management system 660 of FIG. 6. In some embodiments, some or all of the functionality performed by the efficient vehicle management module 202 and its sub-modules may be performed by one or more computing systems implemented in a vehicle, such as a vehicle 640 of FIG. 6.

The efficient vehicle management module 202 can be configured to communicate and operate with the at least one data store 220, as shown in the example system 200. The at least one data store 220 can be configured to store and maintain various types of data. For example, the data store 220 can store semantic map information, route information, and historical vehicle fleet data relating to power consumption along various routes and in various locations. In some embodiments, some or all data stored in the data store 220 can be stored by the transportation management system 660 of FIG. 6. In some embodiments, some or all data stored in the data store 220 can be stored by the vehicle 640 of FIG. 6. More details about information that can be stored in the data store 220 are provided below.

The semantic map module 204 can be configured to generate and/or maintain semantic map information for one or more geographic regions. Semantic maps can, in various embodiments, be broadly defined to include any map having associated metadata and/or any other layered information associated with the map or elements contained within the map. Semantic map information for a geographic region can include, for example, names and locations of roads, locations of lane boundaries, curvature of roads, speed limits of roads, locations and descriptions of road constraints (e.g., stop signs, speed bumps, traffic lights, cross-walks, etc.), road inclination information (e.g., a degree of incline or decline for each road segment in the region), locations and descriptions of static obstacles (e.g., construction), traffic condition information, and the like. As will be described in greater detail below, preconstructed semantic maps can be utilized by the route planner module 206 to determine a route for a vehicle, by the trajectory planner module 208 to determine a trajectory for a vehicle, and/or by the vehicle management module 210 to make various vehicle management determinations for a vehicle.

In certain embodiments, semantic map information can also include historical power consumption information. For example, for various roads, road segments, and/or routes in a region, the semantic map module 204 can maintain information pertaining to how much power vehicles have historically consumed along the various roads and/or road segments. Power consumption may be measured, for example, in terms of electric power (e.g., kWh), or gas power (e.g., liters of gas). In certain embodiments, historical power consumption data may be determined from transportation data collected by a fleet of vehicles that offer ride services. In various embodiments, as vehicles drive along roads and/or road segments, information describing power consumption along those roads and/or road segments can be shared (or broadcasted) to other vehicles, such as the vehicle 640 of FIG. 6, over one or more computer networks. In some embodiments, such information can be shared in real-time (or near real-time) once a particular road has been traversed to allow other vehicles to generate more accurate power consumption estimates.

The route planner module 206 can be configured to determine a route for a vehicle. For example, the route planner module 206 may receive a starting location and a destination location. The route planner module 206 can utilize a semantic map to generate one or more routes from the starting location to the destination location. As will be described in greater detail below, the vehicle management module 210 can utilize route information from the route planner module 206 and semantic map information from the semantic map module 204 to estimate and optimize power consumption along a route. In certain embodiments, the route planner module 206 can utilize historical power consumption information maintained in a semantic map to select a route that when driven by a vehicle has historically achieved a threshold level of energy efficiency or has historically achieved a higher level of energy efficiency than other available routes (e.g., has historically required vehicles to consume less energy). In certain embodiments, the route planner module 206 can be constrained such that a route is only selected if an estimated time to drive the route is within a threshold time of a route having a fastest estimated travel time.

The trajectory planner module 208 can be configured to determine a trajectory for a vehicle. The vehicle may be, for example, an autonomous, semi-autonomous, or manually-driven vehicle, such that the trajectory indicates an intended and/or a predicted path that the vehicle intends or is predicted to follow during a selected period of time in the immediate future. Trajectory information associated with a vehicle's trajectory can include an intended or predicted path for the vehicle for an upcoming selected period of time (e.g., the next n seconds, where n is any suitable numerical value). As an example, the upcoming selected period of time can be, for example, 10-30 seconds or some other suitable period of time. Trajectory information can also include an intended or predicted velocity and/or an intended or predicted acceleration along a plurality of points along the intended or predicted path. In certain embodiments, a trajectory may be a mapping in time, wherein for a plurality of time intervals, each time interval is associated with an intended or predicted position, an intended or predicted velocity, and/or an intended or predicted acceleration of a vehicle. For example, trajectory information may specify that for a particular vehicle, in 0.5 seconds after a current time, the vehicle should have a particular position, and be traveling at 45 mph, and decelerating at 10 mph/second, and in 1 second after the current time, the vehicle should have a second position, and be traveling at 40 mph, and decelerating at 10 mph/second, and in 1.5 seconds after the current time, the vehicle should have a third position, and be traveling at 35 mph, and decelerating at 10 mph/second, and so forth.

In certain embodiments, the trajectory planner module 208 can be configured to determine a trajectory based on route information, semantic map information, and/or sensor information. The trajectory planner module 208 can receive a route from the route planner module 206, and can be constrained to determine a trajectory that maintains the route specified by the route planner module 206. For example, if the route planner module 206 has specified that the vehicle should travel straight through an intersection, the trajectory planner module 208 may be constrained from making an independent decision to turn at the intersection. In certain embodiments, the trajectory planner module 208 and the route planner module 206 may interact with one another such that the trajectory planner module 208 can request an updated route if necessary. For example, if the trajectory planner module 208 receives information about road or driving conditions (e.g., detected from an array of sensors) which necessitates a new route, the trajectory planner module 208 may request the new route from the route planner module 206.

The trajectory planner module 208 can also utilize semantic map information and/or sensor information in order to generate a trajectory that takes into account various features of a vehicle's environment. For example, semantic map information can be used to identify the locations of lane boundaries, locations of roads, speed limits, locations of road constraints (e.g., stop signs, traffic lights, etc.). The trajectory planner module 208 can generate a trajectory that takes into account the information contained in the semantic map. For example, if the semantic map specifies that a stop sign is approaching and is located at a particular position, the trajectory planner module 208 can generate a trajectory that will stop at the location of the stop sign. Similarly, the trajectory planner module 208 can utilize sensor information to generate a trajectory that accounts for objects around the vehicle. For example, sensor information may be provided by an array of sensors 644 shown in FIG. 6. Sensor information can be utilized to generate a trajectory that, for example, avoids contact or otherwise unsafe interaction with other vehicles, pedestrians, or other objects that may be nearby the vehicle. In certain instances, sensor information can be used, either alone or in conjunction with semantic map information, to identify the locations of lane boundaries, road constraints, and the like. In certain embodiments, the trajectory planner module 208 can be configured to update a vehicle's trajectory at a selected update rate (e.g., multiple (5, 10, 25, etc.) times a second) to, for example, account for new and updated sensor information.

The vehicle management module 210 can be configured to make vehicle management determinations based on semantic map information, route information, and/or trajectory information. Vehicle management determinations can include, for example, power management determinations and/or transmission management determinations. More details regarding the vehicle management module 210 will be provided below with reference to FIG. 3.

Figure 3:
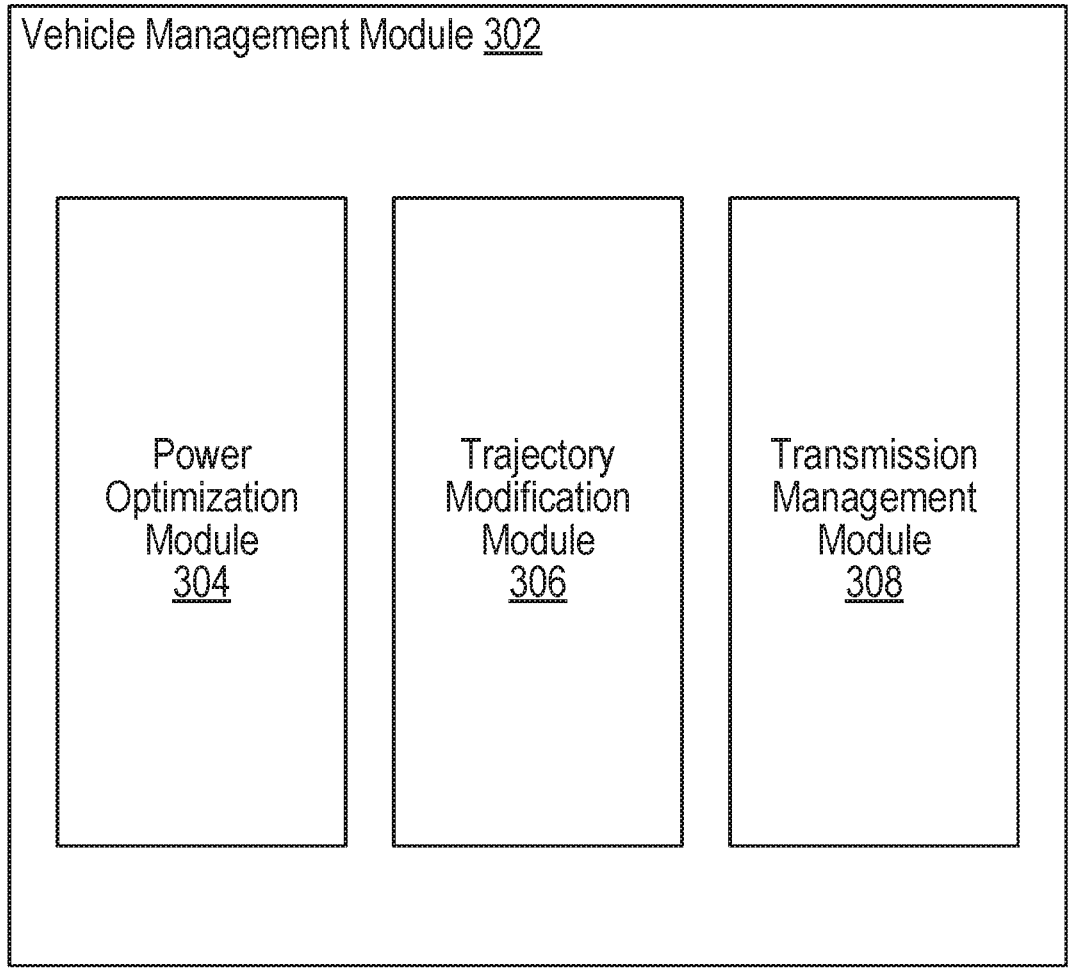
FIG. 3 illustrates an example vehicle management module, according to an embodiment of the present technology.

FIG. 3 illustrates an example vehicle management module 302, according to an embodiment of the present technology. In some embodiments, the vehicle management module 210 of FIG. 2 can be implemented with the vehicle management module 302. The vehicle management module 302 can be configured to make vehicle management determinations based on semantic map information, route information, and/or trajectory information. The vehicle management determinations can be converted into signals that enable or disable vehicle mechanisms to control and optimize operation of a vehicle. Vehicle management determinations can include, for example, power management determinations and/or transmission management determinations. For example, based on available information, the vehicle management module 302 can be configured to enable or disable various vehicle features or settings that can impact vehicle control, such as power management or vehicle transmission management. As shown in the example of FIG. 3, the vehicle management module 302 can include a power optimization module 304, a trajectory modification module 306, and a transmission management module 308.

The power optimization module 304 can be configured to make one or more power management determinations based on trajectory information, route information, and/or semantic map information. In various embodiments, power management determinations can include one or more of the following: whether to turn a gas engine on or off, and when to do so; whether to turn one or more electric motors on or off, and when to do so; whether to engage or disengage regenerative magnetic brakes, and when to do so; whether to use or not use friction brakes, and when to do so; what proportions of friction brakes versus magnetic brakes to use; what proportions of gas engine, electric motor, and engine brake to use; and the like.

In certain embodiments, the power optimization module 304 can be configured to generate a power optimization plan which includes intended power management determinations for an upcoming period of time. For example, as discussed above, trajectory information can include predicted/intended positions, accelerations, and velocities for a vehicle for an upcoming selected period of time (e.g., the next 10-30 seconds). This trajectory information allows the power optimization module 304 not only to make power management determinations to be implemented immediately, but also allows the power optimization module 304 to make power management determinations associated with the trajectory over the upcoming selected period of time. A power optimization plan may include power management determinations to be implemented at particular times or at particular positions along a trajectory and/or a route. For example, if the trajectory information indicates that a vehicle will be stopped for the next 4 seconds, and then accelerate quickly, the power optimization module 304 can generate a power optimization plan that turns off the gas engine and electric motors for the next 4 seconds and thereafter turns them both back on. Or in another example, if the trajectory information specifies a plurality of locational positions for a vehicle over the next x seconds (e.g., at a first position at time1, at a second position at time2, at a third position at time3, etc.), the power optimization module 304 can generate a power optimization plan that turns off the gas engine at a first time and position, and then turns on the gas engine at a second time and position.

Furthermore, as also discussed above, route information and semantic map information may provide information for the entirety of a planned route. Driving the route may take on the order of minutes or even hours. The power optimization module 304 can generate a power optimization plan for an entire route based on the route information and semantic map information. For example, if route information and semantic map information indicate that a route includes a downhill portion, followed by an uphill portion, followed by a downhill portion, the power optimization module 304 can utilize this information to determine that the downhill portions will allow for sufficient charging of the vehicle battery to allow for the vehicle to traverse the entirety of the route using only an electric motor such that no fuel need be consumed on the route at all. Again, the power optimization plan may include power management determinations to be implemented at particular times or at particular positions along a trajectory and/or a route.

In various embodiments, the power optimization module 304 can be configured to utilize trajectory information, route information, and/or semantic map information to estimate power consumption for a route. In certain embodiments, the power optimization module 304 can be configured to make power management determinations (e.g., in a power optimization plan) such that a charge level on a vehicle battery does not fall below a lower threshold value and/or does not go above an upper threshold value.

As discussed above, a vehicle's trajectory can be updated multiple times a second (e.g., 10 times a second). Similarly, a vehicle's route may be changed at any time due to unexpected circumstances. As such, the power optimization module 304 can be configured to periodically receive updated trajectory information, route information, and/or semantic map information and to periodically update a power optimization plan and power management determinations outlined within the power optimization plan. For example, the power optimization module 304 can be configured to update the power optimization plan (and power management determinations contained therein) multiple times a second or every few seconds based on updated information.

The trajectory modification module 306 can be configured to provide power management determination information for updating, modifying, and/or affecting a vehicle trajectory. As discussed above, with reference to the trajectory planner module 208, a vehicle trajectory can be determined based on route information, semantic map information, and/or sensor information. The trajectory planner module 208 can generate a trajectory that accounts for a particular route and various features detected along or associated with the route. Similarly, the trajectory planner module 208 can generate a trajectory based on power management determination information provided by the trajectory modification module 306. Certain power management determinations may affect various constraints or other features of a trajectory. For example, if the power optimization module 304 determines that electric motors or the gas engine should be turned off, a vehicle's maximum acceleration may be lower than if both of them were on. Conversely, if both the electric motors and gas engine are turned on, the vehicle's trajectory can perform a faster acceleration. Similarly, if the power optimization module 304 makes a determination to utilize magnetic brakes instead of friction brakes, or vice versa, or both, the maximum braking power and maximum deceleration of the vehicle may be affected. The trajectory modification module 306 can be configured to provide the trajectory planner module 208 with updated power management determination information so that the trajectory planner module 208 can take these determinations into account when determining a vehicle trajectory.

In certain embodiments, the trajectory planner module 208, the power optimization module 304, and/or the trajectory modification module 306 can be optimized together such that they are not simply reacting to the behavior of and/or information from other modules, but are implemented such that the considerations of each module are implemented in a single decision-making process. In earlier-described embodiments, the trajectory planner module 208 could generate a trajectory and the power optimization module 304 could make one or more power optimization determinations based on various factors, including route information and trajectory information. The trajectory planner module 208 could then receive power management determination information from the trajectory modification module 306, and then modify the trajectory based on the power management determination information. However, in other embodiments, the trajectory and one or more power optimization determinations can be determined simultaneously in a single process, such that the trajectory, as initially determined, already takes into account any power optimization determinations. Further, in some embodiments, power optimization determinations can influence or change determinations of trajectory. In this regard, an initial determination of a trajectory can be changed based on a power optimization determination. As just one example, if a trajectory would result in a suboptimal usage of power as determined by the power optimization module 304, the trajectory can be changed to result in an optimal usage of power.

The transmission management module 308 be configured to make vehicle transmission determinations based on route information, trajectory information, and/or semantic map information. For example, a naïve, conventional system may predict that a small deceleration by a vehicle should result in the vehicle being automatically shifted to a higher gear. However, if the vehicle will be accelerating a few seconds after the small deceleration, shifting the vehicle to a higher gear would result in an unnecessary up and down shift, which increases latency and negatively impacts user experience. Conversely, based on the present technology, if trajectory information indicates that the vehicle will have a small deceleration, but then accelerate a few seconds later, the transmission management module 308 can utilize this information to wait, and then shift to a lower gear at the appropriate time. Similarly, in another example, if semantic map information indicates that a particular portion of a particular route has a steep incline or decline, the transmission management module 308 can be configured to take the incline or decline into account when selecting an appropriate gear.

Figure 4A:
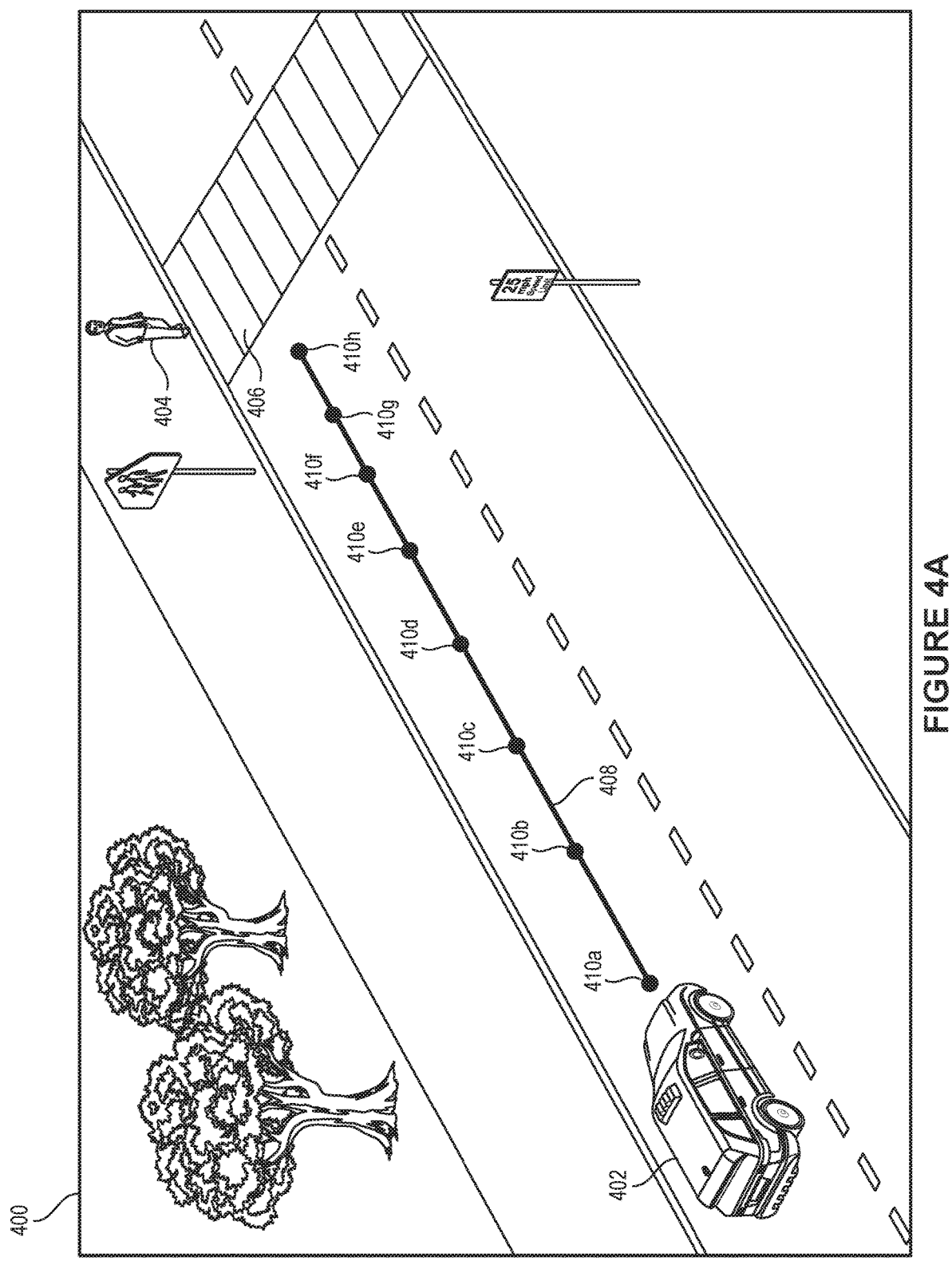
FIG. 4A illustrates an example scenario, according to an embodiment of the present technology.

FIG. 4A illustrates an example scenario 400 in which the efficient vehicle management module 202 can perform vehicle control, according to an embodiment of the present technology. In the example scenario 400, a vehicle 402 (e.g., hybrid vehicle) is traveling down a road (i.e., a one-way road). The vehicle 402 determines, based on semantic map information and/or sensor information, that there is a crosswalk 406 and a pedestrian 404 is about to enter the crosswalk 406. As such, the vehicle 402 can generate a trajectory 408 (e.g., the trajectory planner module 208) that results in the vehicle 402 gradually coming to a stop before the crosswalk 406. The trajectory 408 includes a plurality of intended positions 410a-410h. Each intended position 410a-410h may also be associated with an intended velocity and/or an intended acceleration. A power management system (e.g., the vehicle management module 210) can determine that the trajectory of the vehicle 402 will result in the vehicle coming to a stop. As such, as the vehicle 402 traverses along the trajectory 408 from position 410a to position 410h, the engines and motors of the vehicle 402 can be shut off to conserve energy. Under conventional approaches, the engines and motors of a vehicle in this situation disadvantageously are not shut off until the vehicle arrives at a complete stop at position 410h.

Figure 4B:
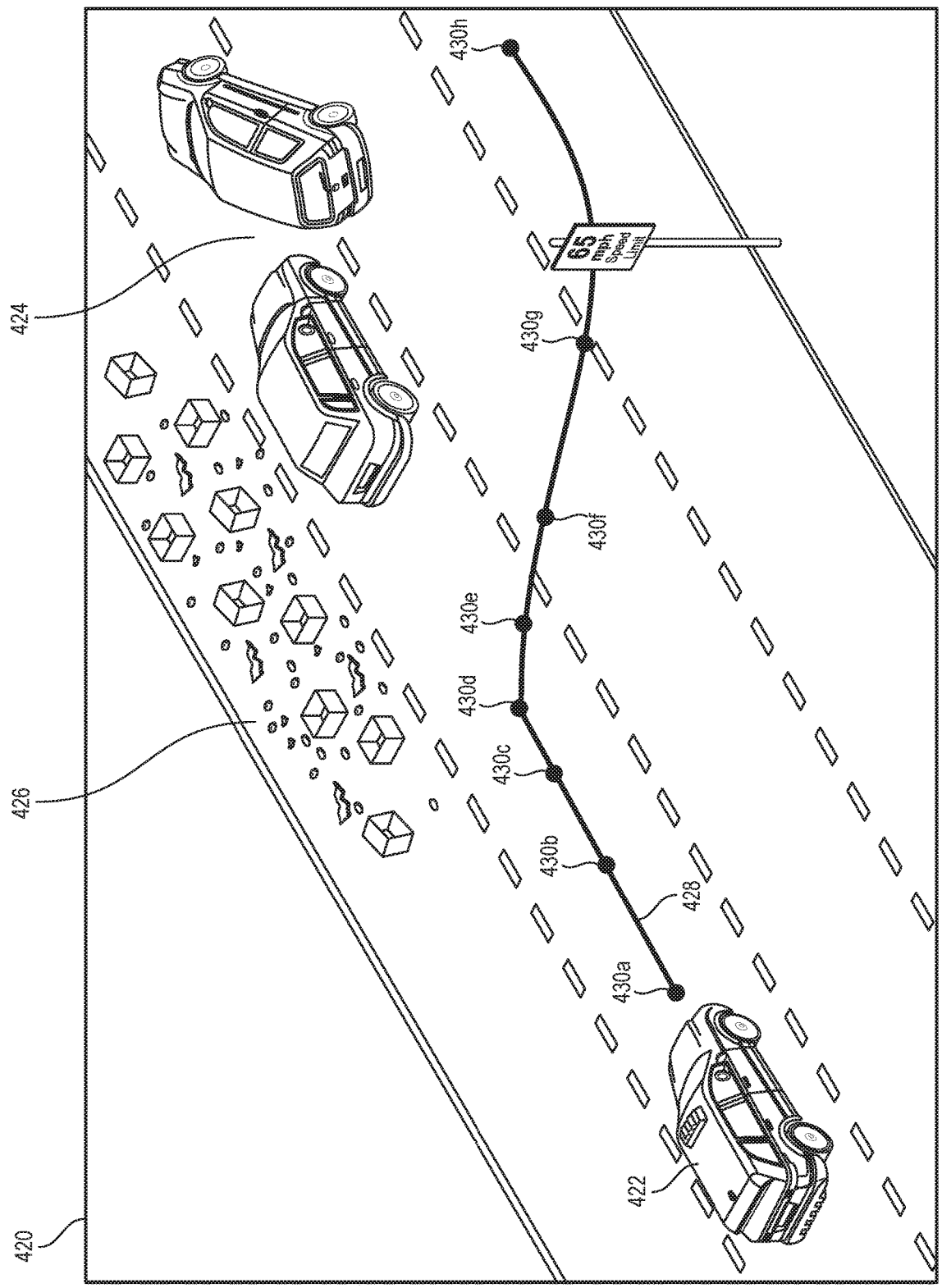
FIG. 4B illustrates an example scenario, according to an embodiment of the present technology.

FIG. 4B illustrates another example scenario 420 in which the efficient vehicle management module 202 can perform vehicle control, according to an embodiment of the present technology. In the example scenario 420, a vehicle 422 (e.g., hybrid vehicle) is traveling on a divided freeway when it detects debris 426 and a traffic accident 424 based on sensor information and/or semantic map information. In response to detecting these obstacles, the trajectory planner module 208 can generate a trajectory 428 which avoids the obstacles. The trajectory 428 includes a plurality of positions 430a-430h. The trajectory 428 specifies that the vehicle 422 will gradually come to a stop by position 430d, and then accelerate quickly from position 430d to position 430h. In order to conserve energy, the vehicle management module 210 and/or the power optimization module 304 can generate a power optimization plan based on the trajectory information. The power optimization plan may include one or more intended power management determinations. For example, the power optimization plan may specify that from positions 430a to position 430d, the gas engine and the electric motors on the vehicle 422 will be shut off, and the magnetic regenerative brakes will be engaged to slow the vehicle down. The power optimization plan may also specify that from position 430d to positions 430h, both the gas engine and the electric motor will be turned on in order to provide maximum acceleration. In certain embodiments, the trajectory modification module 306 may inform the trajectory planner module 208 that both the gas engine and electric motors will be on so that the trajectory planner module 208 can generate a trajectory that accounts for the maximum acceleration that can be achieved using both the gas engine and the electric motors. Many variations are possible.

Figure 4C:
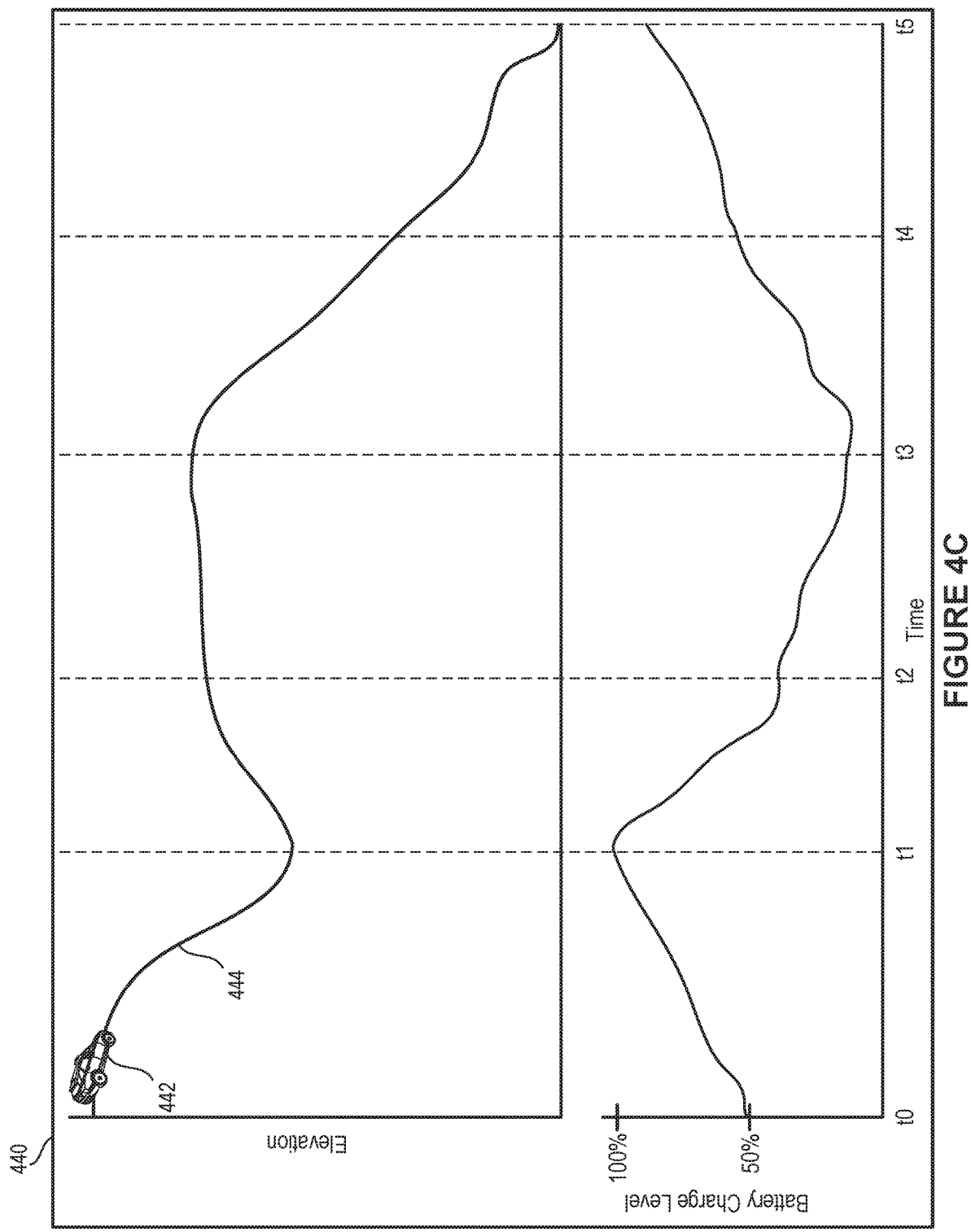
FIG. 4C illustrates an example scenario, according to an embodiment of the present technology.

FIG. 4C illustrates another example scenario 440 in which the efficient vehicle management module 202 can perform vehicle control, according to an embodiment of the present technology. In the example scenario 440, a vehicle 442 is traveling on a path 444. The path 444 is the same as the path 104 shown in FIGS. 1A and 1B. However, in this example scenario 440, rather than allow a conventional vehicle power management system to naively control power management settings without knowledge of the vehicle's trajectory or route, the vehicle's power management is optimized by accounting for the vehicle's route. Route information and semantic map information may indicate to the power optimization module 304 that the vehicle 442 will be traveling downhill for a period, and then uphill, and then back downhill. Using the route information and the semantic map information, the power optimization module 304 can estimate power consumption along the path 444, and can determine that the vehicle 442 likely can travel the entire path 444 without turning on the vehicle's gas engines. From time t1 to t3, the vehicle is traveling uphill, and the charge on the battery falls to a low level. However, the power optimization module 304 recognizes that the vehicle will soon be going downhill again. As such, the power optimization module 304 determines that the gas engine should remain off. At time t3, the vehicle 442 begins the final downhill descent, and from time t3 to t5, the battery is recharged to maximum capacity. Compared to the scenario depicted in FIG. 1B, the example scenario 440 results in no fuel expended and more efficient utilization of energy.

Figure 5:
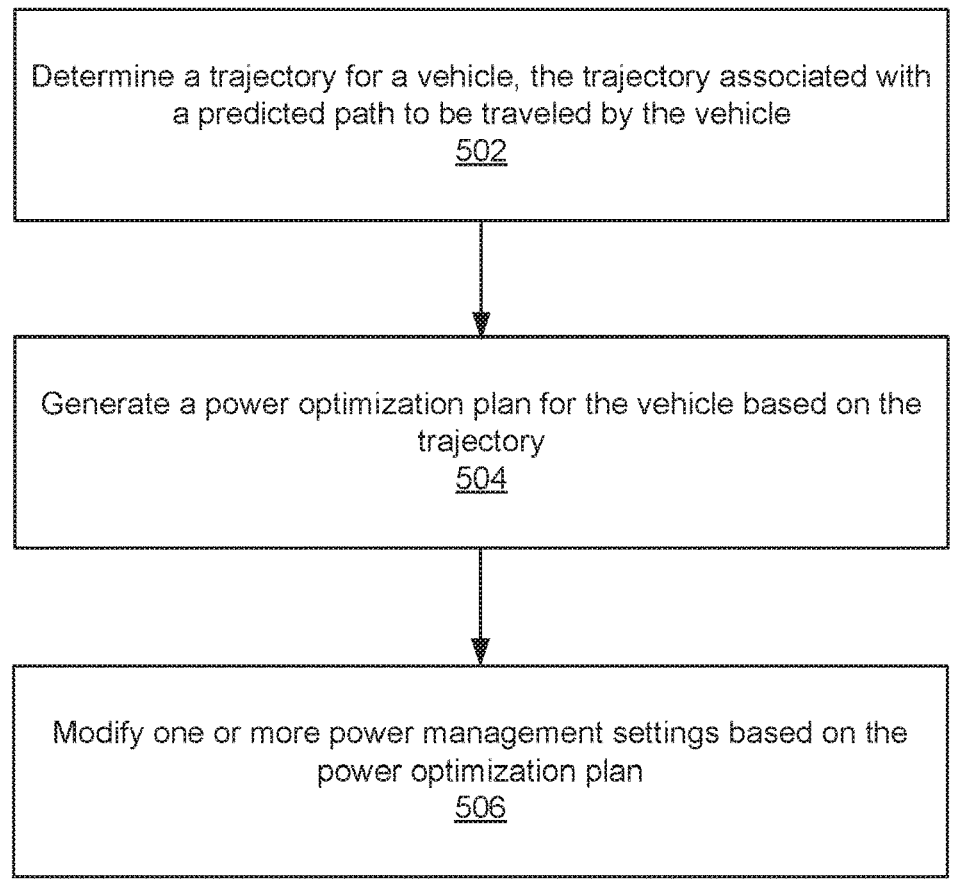
FIG. 5 illustrates an example method, according to an embodiment of the present technology.

FIG. 5 illustrates an example method 500, according to an embodiment of the present technology. At block 502, the example method 500 can determine a trajectory for a vehicle, the trajectory associated with a predicted path to be traveled by the vehicle. At block 504, the example method 500 can generate a power optimization plan for the vehicle based on the trajectory. At block 506, the example method 500 can modify one or more power management settings based on the power optimization plan.

Many variations to the example method are possible. It should be appreciated that there can be additional, fewer, or alternative steps performed in similar or alternative orders, or in parallel, within the scope of the various embodiments discussed herein unless otherwise stated.

Figure 6:
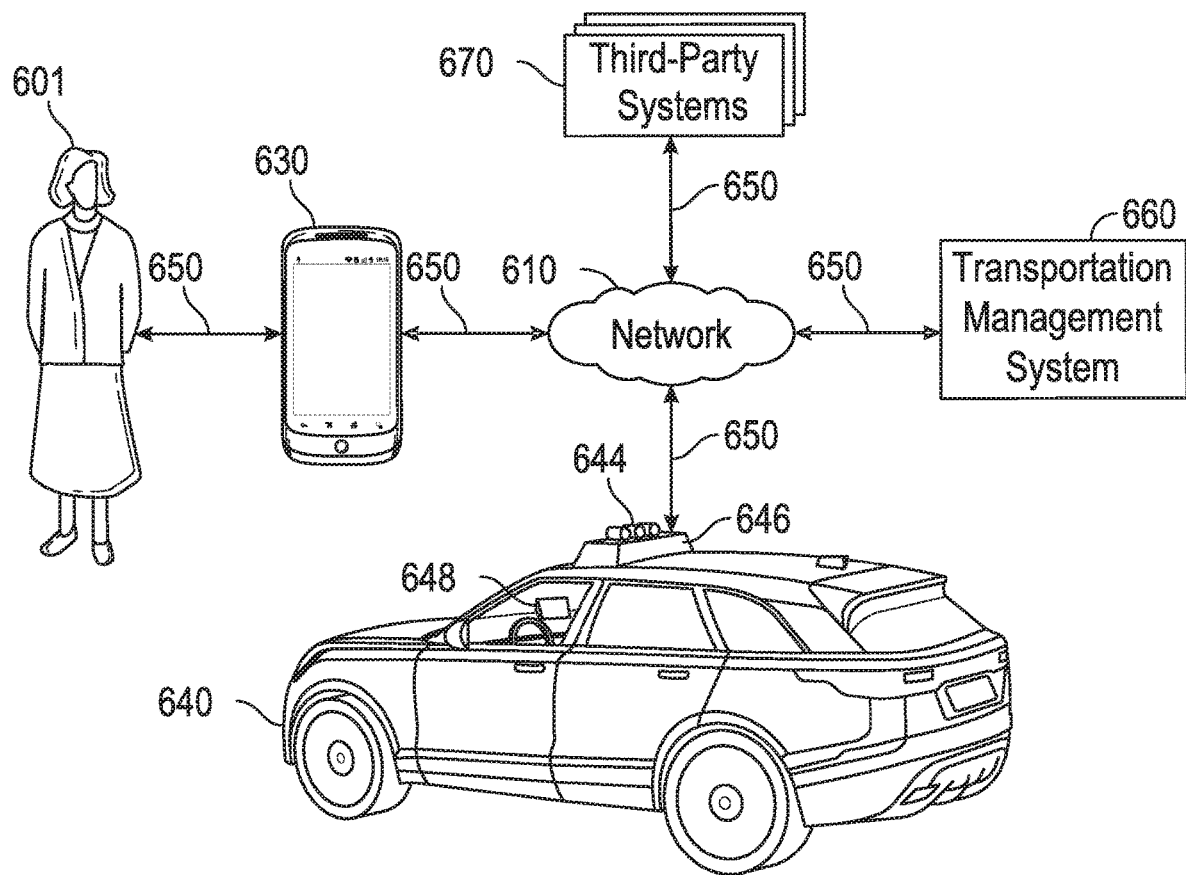
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the efficient vehicle management module 202 may be implemented by one or more computing systems of the transportation management system 660. In some embodiments, some or all modules of the efficient vehicle management module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via a transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news), ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
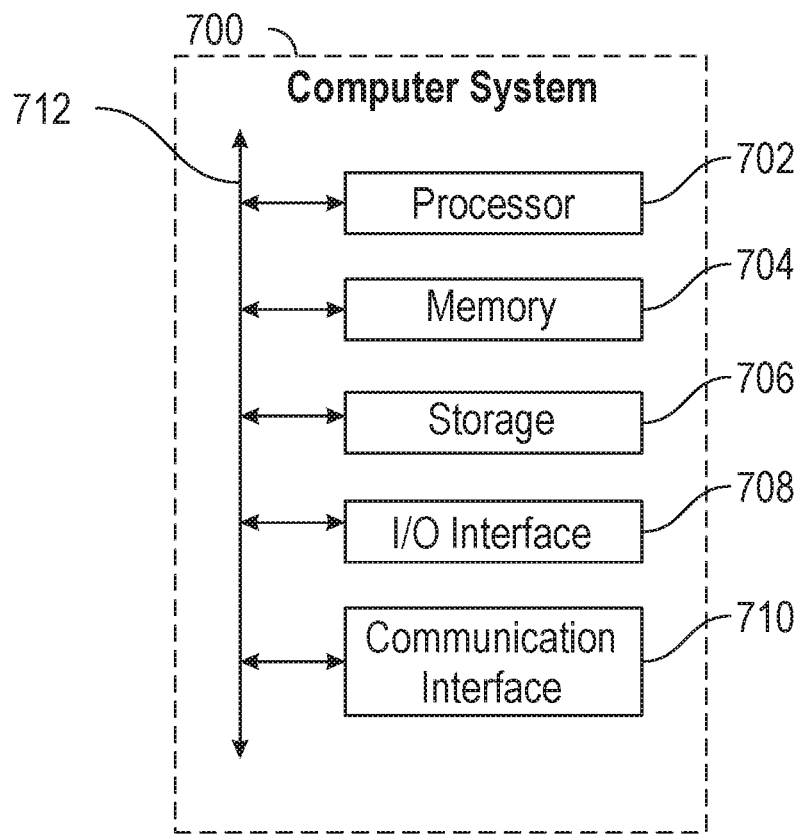
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system of a vehicle, a detected change in an environment external to the vehicle based on sensor data of the environment captured by one or more sensors of the vehicle while the vehicle is operating under one or more power management settings;
   generating, by the computing system of the vehicle, a trajectory for the vehicle in the environment, wherein the trajectory is generated using the detected change in the environment that is based on the sensor data;
   generating, by the computing system of the vehicle, a power optimization plan for the vehicle based on the trajectory; and
   modifying, by the computing system of the vehicle, the one or more power management settings based on the power optimization plan.

2. The computer-implemented method of claim 1, wherein the modifying the one or more power management settings comprises engaging or disengaging at least one of: a gas engine, an electric motor, or a magnetic regenerative brake on the vehicle.

3. The computer-implemented method of claim 2, wherein the trajectory comprises a plurality of positions to be traveled by the vehicle and the one or more power management settings are modified along one or more positions of the plurality of positions.

4. The computer-implemented method of claim 1, wherein the detected change includes an obstacle and the generating the trajectory for the vehicle is generated to avoid the obstacle.

5. The computer-implemented method of claim 1, wherein the trajectory comprises:
   a plurality of positions defining a predicted path to be traveled by the vehicle,
   a predicted velocity for the vehicle for each position of the plurality of positions, and
   a predicted acceleration for the vehicle for each position of the plurality of positions, wherein the predicted velocity for the vehicle for at least one position of the plurality of positions and the predicted acceleration for at least one position of the plurality of positions correspond to an updated velocity and an updated acceleration with respect to an original velocity and an original acceleration of an original predicted path.

6. The computer-implemented method of claim 5, wherein the trajectory further comprises a time interval for the vehicle for each position of the plurality of positions and the time interval for the vehicle for at least one position of the plurality of positions corresponds to an updated time interval with respect to an original time interval of the original predicted path.

7. The computer-implemented method of claim 1, further comprising determining a route to be taken by the vehicle, wherein the generating the power optimization plan for the vehicle comprises generating the power optimization plan for the vehicle based on the trajectory and the route.

8. The computer-implemented method of claim 7, wherein the route comprises a plurality of positions, and the power optimization plan comprises a power management determination to be applied at a particular position of the plurality of positions.

9. The computer-implemented method of claim 1, further comprising identifying semantic map information for the trajectory to be taken by the vehicle, wherein the generating the power optimization plan for the vehicle comprises generating the power optimization plan for the vehicle based on the trajectory and the semantic map information.

10. The computer-implemented method of claim 1, further comprising:
    modifying the trajectory for the vehicle based on the power optimization plan.

11. A system of a vehicle comprising:
    at least one processor; and
    a memory storing instructions that, when executed by the at least one processor, cause the at least one processor to perform:
       determining a detected change in an environment external to the vehicle based on sensor data of the environment captured by one or more sensors of the vehicle while the vehicle is operating under one or more power management settings;
       generating a trajectory for the vehicle in the environment, wherein the trajectory is generated using the detected change in the environment that is based on the sensor data;
       generating a power optimization plan for the vehicle based on the trajectory; and
       modifying the one or more power management settings based on the power optimization plan.

12. The system of claim 11, wherein the modifying the one or more power management settings comprises engaging or disengaging at least one of: a gas engine, an electric motor, or a magnetic regenerative brake on the vehicle.

13. The system of claim 12, wherein the trajectory comprises a plurality of positions to be traveled by the vehicle and the one or more power management settings are modified along one or more positions of the plurality of positions.

14. The system of claim 11, wherein the detected change includes an obstacle and the generating the trajectory for the vehicle is generated to avoid the obstacle.

15. The system of claim 11, wherein the trajectory comprises:
    a plurality of positions defining a predicted path to be traveled by the vehicle,
    a predicted velocity for the vehicle for each position of the plurality of positions, and
    a predicted acceleration for the vehicle for each position of the plurality of positions, wherein the predicted velocity for the vehicle for at least one position of the plurality of positions and the predicted acceleration for at least one position of the plurality of positions correspond to an updated velocity and an updated acceleration with respect to an original velocity and an original acceleration of an original predicted path.

16. A non-transitory computer-readable storage medium including instructions that, when executed by at least one processor of a computing system of a vehicle, cause the computing system of the vehicle to perform a method comprising:
    determining, by a computing system of a vehicle, a detected change in an environment external to the vehicle based on sensor data of the environment captured by one or more sensors of the vehicle while the vehicle is operating under one or more power management settings;
    generating a trajectory for the vehicle in the environment, wherein the trajectory is generated using the detected change in the environment that is based on the sensor data;
    generating a power optimization plan for the vehicle based on the trajectory; and modifying the one or more power management settings based on the power optimization plan.

17. The non-transitory computer-readable storage medium of claim 16, wherein the modifying the one or more power management settings comprises engaging or disengaging at least one of: a gas engine, an electric motor, or a magnetic regenerative brake on the vehicle.

18. The non-transitory computer-readable storage medium of claim 17, wherein the trajectory comprises a plurality of positions to be traveled by the vehicle and the one or more power management settings are modified along one or more positions of the plurality of positions.

19. The non-transitory computer-readable storage medium of claim 16, wherein the detected change includes an obstacle and the generating the trajectory for the vehicle is generated to avoid the obstacle.

20. The non-transitory computer-readable storage medium of claim 16,
wherein the trajectory comprises:
a plurality of positions defining a predicted path to be traveled by the vehicle,
a predicted velocity for the vehicle for each position of the plurality of positions, and
a predicted acceleration for the vehicle for each position of the plurality of positions, wherein the predicted velocity for the vehicle for at least one position of the plurality of positions and the predicted acceleration for at least one position of the plurality of positions correspond to an updated velocity and an updated acceleration with respect to an original velocity and an original acceleration of an original predicted path.

* * * * *